UNITED STATES PATENT OFFICE.

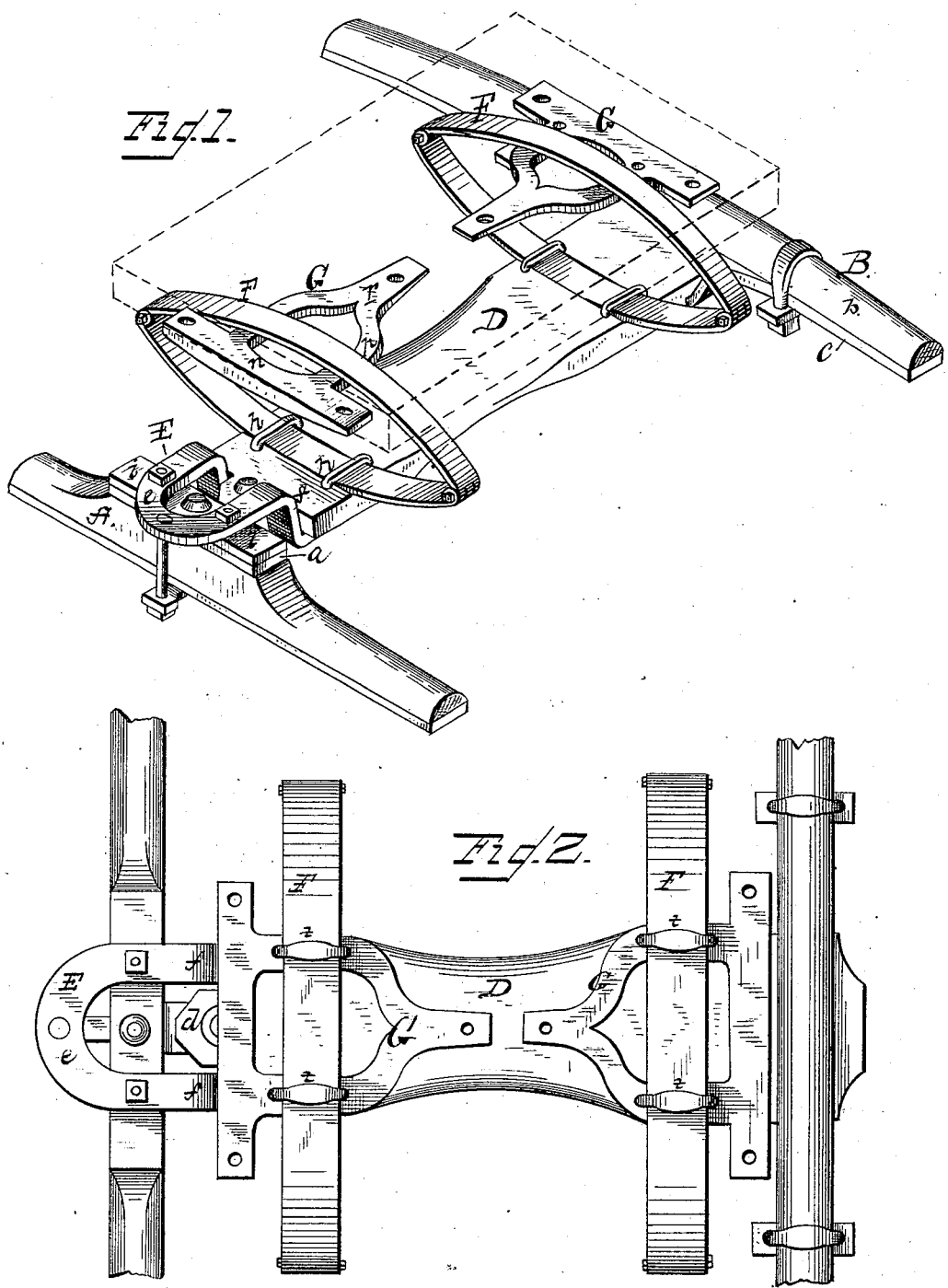

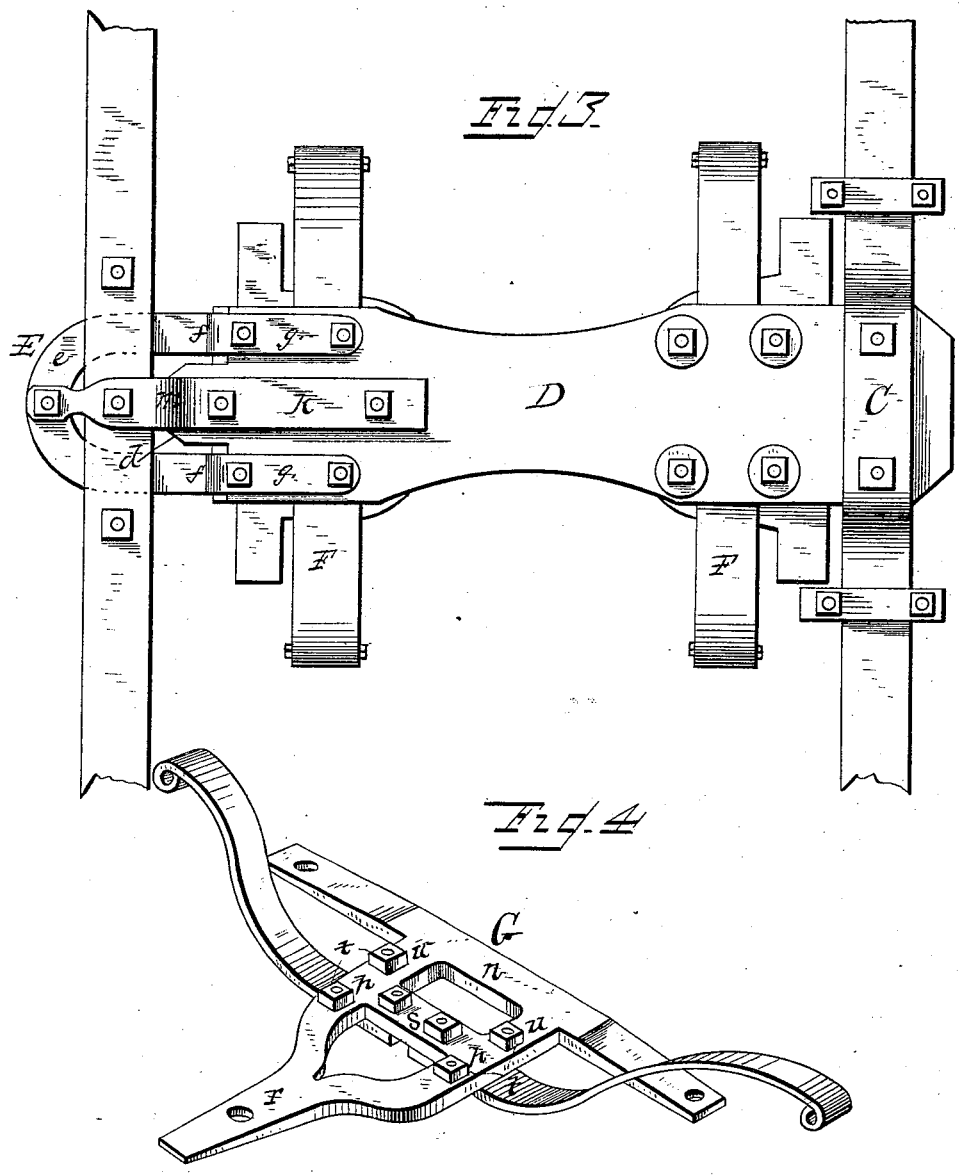

THOMAS B. JONES, OF MADISONVILLE, KENTUCKY.

RUNNING-GEAR FOR VEHICLES.

SPECIFICATION forming part of Letters Patent No. 282,733, dated August 7, 1883.

Application filed May 5, 1883. (Model.)

*To all whom it may concern:*

Be it known that I, THOMAS BURTON JONES, a citizen of the United States of America, residing at Madisonville, in the county of Hopkins and State of Kentucky, have invented certain new and useful Improvements in Running-Gear for Road-Vehicles; and I do hereby declare the following to be a full, clear, and exact description of the invention, such as will enable others skilled in the art to which it appertains to make and use the same.

This invention has relation to the running-gear of road-vehicles, and contemplates improvements in the special features hereinafter set forth.

The objects of the invention are, first, to attain complete and reliable coupling means between the axles of the vehicles; second, to give additional elasticity to the spring movements of the body of the vehicle; and, third, to provide peculiar and reliable fastening means for the springs to the body.

In the accompanying drawings, forming a part of this specification, Figure 1 is a perspective view of a running-gear, showing my improvement. Fig. 2 is a plan view. Fig. 3 is a reverse plan view, showing my improvements on the under side; and Fig. 4 is an inverted perspective view of my improved T-iron attached to a semi-elliptical spring.

The letter A represents the front axle of the vehicle, of the usual construction, and carrying on its upper surface the rigidly-secured bed-plate a.

The letter B represents the hind axle, consisting, preferably, of the wooden portion b and the iron portion c, the latter securely fixed to the former by clips or other suitable means, and formed or provided with the broad central loop, C, for the purpose of receiving the broad center bar, hereinafter described.

The letter D represents my improved center bar, serving as a coupling means for the vehicle, and at the same time as a platform to which the springs may be attached, as shown in the drawings. This center bar is made broad enough to afford ample width to secure the springs to and obviate, to a great extent, and resist any twisting strain on the portions of the gear directly connected therewith. The rear end of the center bar is snugly and accurately fitted to the loop C in the iron of the hind axle, and securely and rigidly fixed therein by bolts, or any other suitable means. The front end of the center bar is formed with the central projection, d, cut or formed on the end to allow the largest latitude of turn desirable.

The letter E represents the fifth-wheel, consisting of the loop e, and formed with the step f and straps g, the last intended to extend under the center bar, and be secured thereto by clips h, which straddle the spring and pass through the center bar and straps g, thus securing these parts together, substantially as shown. Across the circle of the fifth-wheel is rigidly secured the transverse bar i, which serves as the turning-plate for the fifth-wheel. To the under side of the center bar is centrally secured the bar or plate k, formed with the step m, from whence it extends forward and receives the king-bolt and also the nose-bolt of the fifth-wheel.

The letter F represents the springs, in this instance elliptical; but of course semi-elliptical forms may be used and applied, as will be hereinafter specifically set out. These elliptical springs, as heretofore stated, are secured to the center bar and to the T-iron by clips or other suitable fastening means.

The letter G represents the T-irons, by means of which the springs are attached to the body of the vehicle. This T-iron consists of the bar n, body-bars p, and strap r, and, preferably, the cross-piece s. The ends of the cross-bar and the end of the stem have perforations to receive bolts or rivets, whereby it is secured to the body. The body-bars p are also perforated to receive the ends of the clips which straddle the spring, and secure them and the T-iron together.

In Fig. 4 is shown a semi-elliptical spring, which is secured to the T-iron by clip-bolts t and screw-bolts u, the spring in this instance being in two parts, as shown. This class of springs with the T-iron and center bar is applicable to side-bar vehicles, and may be applied by attaching the ends of the spring to the side bars, and then securing the T-iron to the body, as hereinafter described.

By the construction of the center bar and fifth-wheel, and attaching the same to the axle, as stated, I attain a security of construction not heretofore reached, and at the same time I provide a vehicle with an easy-springing capacity.

By the T-iron I apply the body directly to the springs, which obviates the strain usually apparent in cases where the body is swung between the springs; and by securing the rear end of the center bar in a loop in the under side of the axle the strain on that is directly in the line of greatest strength, and is without twist.

By means of my T-iron attached to a semi-elliptical spring and secured to the body of the vehicle, as stated, it is obvious that the center bar may consist of one or more independent bars arranged and adjusted to have the springs secured thereto in the same way as in the single broad center bar, and this construction and arrangement of independent bars secured and arranged in relation to the axles and fifth-wheel, as hereinbefore described, is applicable to a single broad center bar, the springs being arranged thereon between the axles of the vehicle.

What I claim as my invention, and desire to secure by Letters Patent, is—

1. In a road-vehicle, the broad center bar, secured rigidly at its rear to the hind axle of the vehicle, and carrying the fifth-wheel on the forward end thereof, in combination with the springs secured to the center bar, and the T-iron having clips, substantially as described.

2. In combination with a T-iron, constructed as described, and secured to the body of a vehicle, the vehicle-spring secured to said T-iron, substantially as described.

3. In combination with the broad center bar and the springs arranged thereon and between the axles of the vehicle, the T-iron for supporting the body of the vehicle, substantially as described.

4. In a vehicle, the combination of the front and rear axles, the connecting center bar, with the transverse springs clipped thereto, and the T-irons for supporting the body of the vehicle, substantially as described.

In testimony whereof I affix my signature in presence of two witnesses.

THOMAS BURTON JONES.

Witnesses:
GEO. W. RAMSEY,
C. E. MARTIN.